(12) United States Patent
Sakurai et al.

(10) Patent No.: US 11,279,379 B2
(45) Date of Patent: Mar. 22, 2022

(54) ASSIST APPARATUS AND CONTROL METHOD OF THE SAME

(71) Applicant: CLARION CO., LTD., Saitama (JP)

(72) Inventors: Ryo Sakurai, Saitama (JP); Yasuhiko Kodate, Saitama (JP); Toshiyuki Anzai, Saitama (JP); Katsumi Iwano, Saitama (JP)

(73) Assignee: CLARION CO., LTD., Saitama (JP)

( * ) Notice: Subject to any disclaimer, the term of this patent is extended or adjusted under 35 U.S.C. 154(b) by 146 days.

(21) Appl. No.: 16/738,361

(22) Filed: Jan. 9, 2020

(65) Prior Publication Data

US 2020/0223448 A1     Jul. 16, 2020

(30) Foreign Application Priority Data

Jan. 15, 2019    (JP) .............................. JP2019-004630

(51) Int. Cl.
*B60W 60/00* (2020.01)
*B60W 10/18* (2012.01)
*B60W 10/20* (2006.01)

(52) U.S. Cl.
CPC .......... *B60W 60/001* (2020.02); *B60W 10/18* (2013.01); *B60W 10/20* (2013.01); *B60W 60/0051* (2020.02); *B60W 60/0053* (2020.02)

(58) Field of Classification Search
None
See application file for complete search history.

(56) References Cited

U.S. PATENT DOCUMENTS

| 7,610,134 B2 | 10/2009 | Maeda et al. |
| 2012/0089294 A1 | 4/2012 | Fehse et al. |
| 2016/0075331 A1* | 3/2016 | Tomozawa ............ B60W 10/18 701/41 |
| 2016/0207527 A1 | 7/2016 | Hiei et al. |
| 2017/0203757 A1* | 7/2017 | Ohbayashi ........... B62D 15/027 |
| 2018/0043905 A1 | 2/2018 | Kim et al. |
| 2019/0185055 A1* | 6/2019 | Iwami ................... B60W 30/06 |

FOREIGN PATENT DOCUMENTS

| DE | 102016121474 A1 | 5/2018 |
| DE | 102017008816 A1 | 5/2018 |
| JP | 2018-034653 A | 3/2018 |
| JP | 2018-140757 A | 9/2018 |
| WO | 2015/033484 A1 | 3/2015 |

OTHER PUBLICATIONS

Extended European Search Report issued for the counterpart European Patent Application No. 20151104.5-1009.

* cited by examiner

*Primary Examiner* — Hunter B Lonsberry
*Assistant Examiner* — Paysun Wu
(74) *Attorney, Agent, or Firm* — IP Business Solutions, LLC

(57) ABSTRACT

Provided is an assist apparatus for a vehicle leaving a parking space, including an automatic leaving execution unit configured to execute automatic leaving by automatic travel control mode of the vehicle and a switching control unit configured to switch driving of the vehicle from the automatic travel control mode to driver's driving operation mode, in which a state of the vehicle is determined and whether or not to perform a predetermined automatic travel control before switching the drive of the vehicle to the driver's driving operation mode is determined based on the determination result of the state of the vehicle.

6 Claims, 11 Drawing Sheets

ASSIST APPARATUS AND CONTROL METHOD OF THE SAME

INCORPORATION BY REFERENCE

The present application claims priority under 35 U.S.C. § 119 to Japanese Patent Application No. 2019-004630 filed on Jan. 15, 2019. The content of the applications is incorporated herein by reference in its entirety.

BACKGROUND OF THE INVENTION

Field of the Invention

The present invention relates to an assist apparatus and a control method of the assist apparatus.

Description of the Related Art

As a technique for assisting driving of a driver by automatically operating a driving operation for a vehicle leaving, there are following Patent Literatures 1 and 2.

Disclosed in Patent Literature 1 is that "an assist apparatus 12 includes an assist control unit 60 that performs an assist control for an own vehicle 10 leaving from a parking area and an assist continuation determining unit 58 that determines continuation of the assist control by the assist control unit 60, in which the assist continuation determining unit 58 sets an assist target range regarding distance, angle and/or car speed with respect to the position of the own vehicle at the start of the assist control and, when the state of the own vehicle 10 is out of the assist target range, makes determination to interrupt or end the assist control and interrupts or ends the assist control of the assist control unit 60".

Disclosed in Patent Literature 2 is that "a parking assist apparatus according to an embodiment includes a control unit which: executes steering control processing for controlling a steering of a vehicle and car speed control processing for controlling running speed of the vehicle when the vehicle is to be parked or leaved from the parking space; and when a predetermined condition is satisfied after the vehicle is started to be parked or leaved from the parking space, ends first processing that is one out of the steering control processing and the car speed control processing and continues second processing that is the other processing than the first processing out of the steering control processing and the car speed control processing".

CITATION LIST

Patent Literature

Patent Literature 1: Japanese Patent Laid-Open No. 2018-34653
Patent Literature 2: Japanese Patent Laid-Open No. 2018-140757

However, in the conventional techniques, interruption and continuation of the assist control are determined based on the condition that is set at the time of starting the assist control. Therefore, depending on the state after starting the assist control, the assist control not appropriate for the state may be performed in some cases.

The object of the present invention is to provide an assist apparatus capable of achieving more appropriate assist control and to provide a control method of the assist apparatus.

SUMMARY OF THE INVENTION

An aspect of the present invention is an assist apparatus for a vehicle leaving a parking space, including: an automatic leaving execution unit configured to execute automatic leaving by automatic travel control mode of the vehicle; a switching control unit configured to switch driving of the vehicle from the automatic travel control mode to driver's driving operation mode; a state determining unit configured to determine a state of the vehicle; and an automatic travel control determining unit configured to determine, according to a determination result of the state of the vehicle, whether or not to perform a predetermined automatic travel control before switching the driving of the vehicle from the automatic travel control mode to the driver's driving operation mode.

An aspect of the present invention is the assist apparatus described above including a release operation determining unit configured to determine input of a release operation for giving an instruction to stop the automatic travel control mode, wherein the automatic travel control determining unit makes determination based on the state of the vehicle when the release operation is inputted.

An aspect of the present invention is the assist apparatus described above, wherein: the state determining unit determines a leaving state of the vehicle from the parking space; and when a leaving degree of the vehicle from the parking space when the release operation is inputted is equal to or less than a first threshold value, the automatic travel control determining unit determines to perform a predetermined automatic travel control to brake the vehicle before switching the driving of the vehicle from the automatic travel control mode to the driver's driving operation mode.

An aspect of the present invention is the assist apparatus described above, wherein when the leaving degree of the vehicle from the parking space when the release operation is inputted is equal to or more than a second threshold value, the automatic travel control determining unit determines not to perform the predetermined automatic travel control before switching the driving of the vehicle from the automatic travel control mode to the driver's driving operation mode.

An aspect of the present invention is the assist apparatus described above, wherein: a plurality of feature points are set in advance on an external shape of the vehicle; and the state determining unit determines the leaving state based on the number of feature points out of the parking space.

An aspect of the present invention is a control method of an assist apparatus for a vehicle leaving a parking space, the assist apparatus including an automatic leaving execution unit configured to execute automatic leaving by automatic travel control mode of the vehicle and a switching control unit configured to switch driving of the vehicle from the automatic travel control mode to driver's driving operation mode, and the control method includes: a first step of determining a state of the vehicle; and a second step of determining, according to a determination result of the state of the vehicle, whether or not to perform a predetermined automatic travel control before switching the driving of the vehicle from the automatic travel control mode to the driver's driving operation mode.

An aspect of the present invention is the control method of the assist apparatus described above, including a third step of determining input of a release operation for giving an instruction to stop the automatic travel control mode, wherein, in the second step, determination is made based on a state of the vehicle when the release operation is inputted.

An aspect of the present invention is the control method of the assist apparatus described above, wherein: in the first step, a leaving state of the vehicle from the parking space is determined; and in the second step, when a leaving degree of the vehicle from the parking space when the release operation is inputted is equal to or less than a first threshold value, it is determined to perform a predetermined automatic travel control to brake the vehicle before switching the driving of the vehicle from the automatic travel control mode to the driver's driving operation mode.

An aspect of the present invention is the control method of the assist apparatus described above, wherein, in the second step, when the leaving degree of the vehicle from the parking space when the release operation is inputted is equal to or more than a second threshold value, it is determined not to perform the predetermined automatic travel control before switching the driving of the vehicle from the automatic travel control mode to the driver's driving operation mode.

An aspect of the present invention is the control method of the assist apparatus described above, wherein, in the first step, the leaving state is determined based on the number of feature points that are out of the parking space among a plurality of the feature points set in advance on an external shape of the vehicle.

With the present invention, more appropriate assist control can be achieved.

DETAILED DESCRIPTION OF THE PREFERRED EMBODIMENT

Hereinafter, an embodiment of the present invention will be described by referring to the accompanying drawings.

Figure 1:
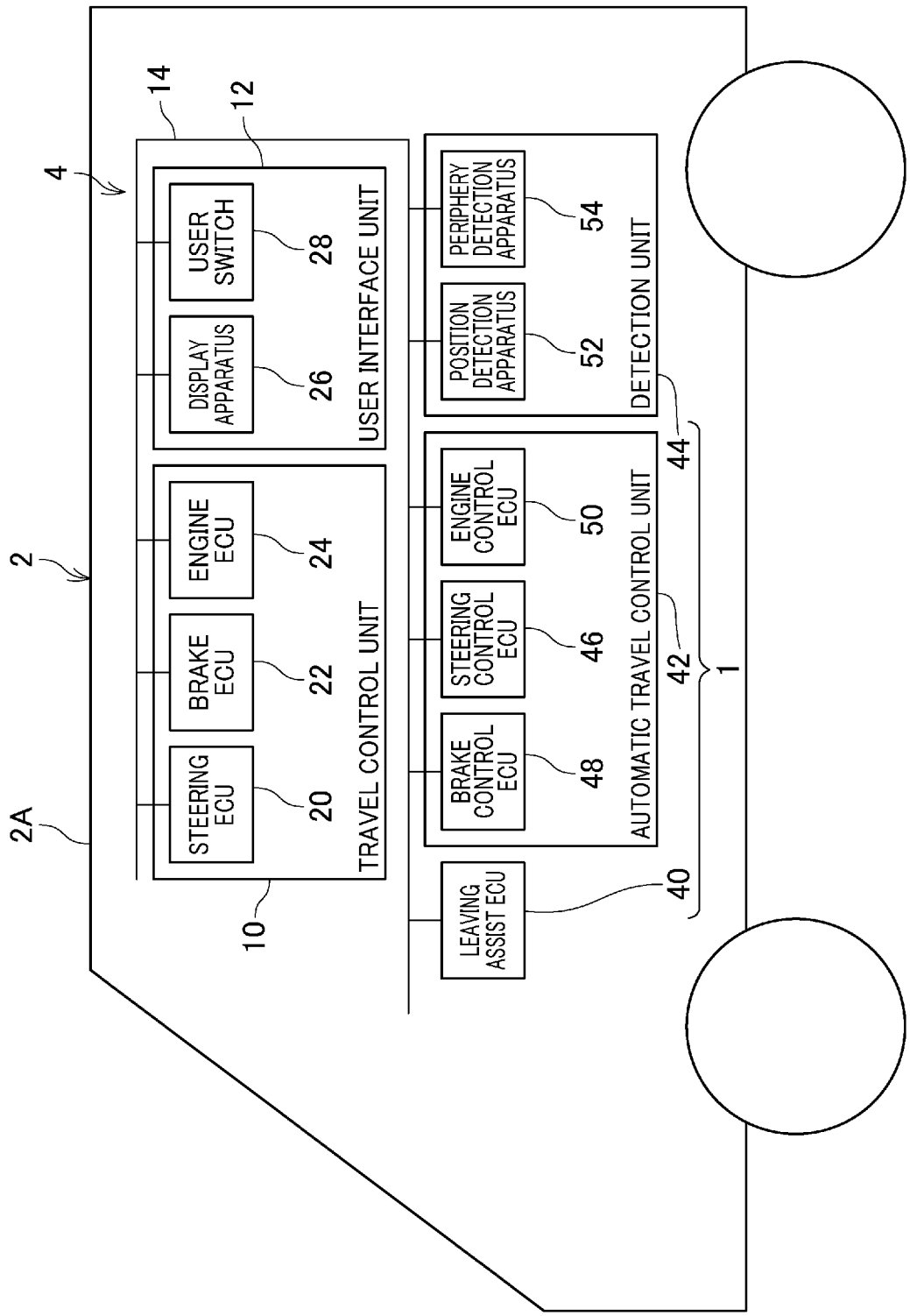
FIG. 1 is a schematic view showing a functional configuration of a leaving assist system according to an embodiment of the present invention.

FIG. 1 is a schematic view showing a functional configuration of a leaving assist system 1 according to the embodiment of the present invention.

The leaving assist system 1 is a system for assisting driving of a driver by implementing automatic leaving of a vehicle 2 from a parking space Ps (FIG. 5) in for example a parking lot by executing automatic travel control mode.

The leaving assist system 1 is provided in an onboard system 4 that is provided in the vehicle 2 as shown in FIG. 1.

The onboard system 4 includes a travel control unit 10 that controls traveling of the vehicle 2, a user interface unit 12 that provides a user interface for the driver, and the leaving assist system 1, and each of those units are mutually connected to be communicable via an onboard LAN 14 such as CAN.

The travel control unit 10 controls various kinds of drive units provided in a vehicle body 2A, and includes various kinds of control apparatuses for controlling the drive units. The travel control unit 10 includes a steering ECU 20, a brake ECU 22, and an engine ECU 24 as such control apparatuses.

The ECU (Electronic Control Unit) is a microcomputer including a processor such as a CPU, a memory device such as a ROM and a RAM, an interface circuit such as an I/O, a bus line for connecting those components, and the like. By executing a program stored in the memory device and a program loaded on the RAM by the processor, the ECUs achieve the target control functions.

The steering ECU 20 controls a steering mechanism that is one of the drive units, and performs a traveling direction control by controlling the steering mechanism of the vehicle 2 according to a steering operation of the driver or a control signal C transmitted from the leaving assist system 1. The brake ECU 22 controls a braking mechanism that is one of the drive units, and performs a speed reduction control by controlling the braking mechanism of the vehicle 2 according to a braking operation of the driver or the control signal C transmitted from the leaving assist system 1. The engine ECU 24 controls the engine that is one of the drive units, which is an apparatus performing a speed control by controlling the engine of the vehicle 2 according to the traveling state of the vehicle 2 or the control signal C transmitted from the leaving assist system 1. By those control apparatuses, travel controls of the vehicle 2 are performed according to the driver's driving operation or the control signal C of the leaving assist system 1.

The user interface unit 12 includes a user operation unit 26 that receives operations of the driver, and a display apparatus 28 that displays various kinds of information to notify the driver. Further, the user interface unit 12 may include a voice output apparatus that notifies various kinds of information to the driver via voice and a voice input apparatus that receives operations via the voice of the driver. Furthermore, the user interface unit 12 may be connected to a mobile information device (for example, a smartphone or a tablet PC) carried by the driver wirelessly or with wire and receive the operations of the driver from the mobile information device.

The leaving assist system 1 according to the embodiment includes a leaving assist ECU 40, an automatic travel control unit 42, and a detection unit 44.

The leaving assist ECU 40 is an apparatus (assist apparatus) which assists leaving by controlling the automatic travel control unit 42 and the detection unit 44, and the functional configuration thereof for assisting leaving will be described later.

The automatic travel control unit 42 generates the control signal C according to an instruction from the leaving assist ECU 40 and outputs the control signal C to the travel control unit 10 to execute the automatic travel control of the vehicle 2, and includes various kinds of control apparatuses for controlling the travel control unit 10. In the embodiment, the automatic travel control unit 42 includes a steering control ECU 46, a brake control ECU 48, and an engine control ECU 50. The steering control ECU 46 is a control apparatus that transmits the control signal C including an operation angle of the steering to the steering ECU 20 in response to an instruction of the leaving assist ECU 40. The brake control ECU 48 is a control apparatus that transmits the control signal C including brake intensity to the brake ECU 22 in response to an instruction of the leaving assist ECU 40. The engine control ECU 50 is a control apparatus that transmits the control signal C including the engine speed to the engine ECU 24 in response to an instruction of the leaving assist ECU 40.

The detection unit 44 detects various kinds of information used for performing the automatic travel control and outputs the information to the leaving assist ECU 40. The detection unit 44 of the embodiment detects information of the vehicle 2 and peripheral information of the vehicle 2 as such information, and includes a position detection apparatus 52 and a periphery detection apparatus 54 for detecting such information.

The position detection apparatus 52 detects the position of the own vehicle as the information of the vehicle 2, and includes a GPS sensor and an autonomous navigation (dead reckoning) apparatus. The autonomous navigation apparatus is an apparatus that calculates the position of the own vehicle based on detected values of the gyro sensor, an accelerometer, a speed pulse sensor, and the like.

The periphery detection apparatus 54 is an apparatus that detects the peripheral state of the vehicle 2 and, in the embodiment, includes an obstacle detection sensor that detects peripheral obstacles. For the obstacle detection sensor, an appropriate sensor such as radar or a camera (imaging apparatus) is used.

Figure 2:
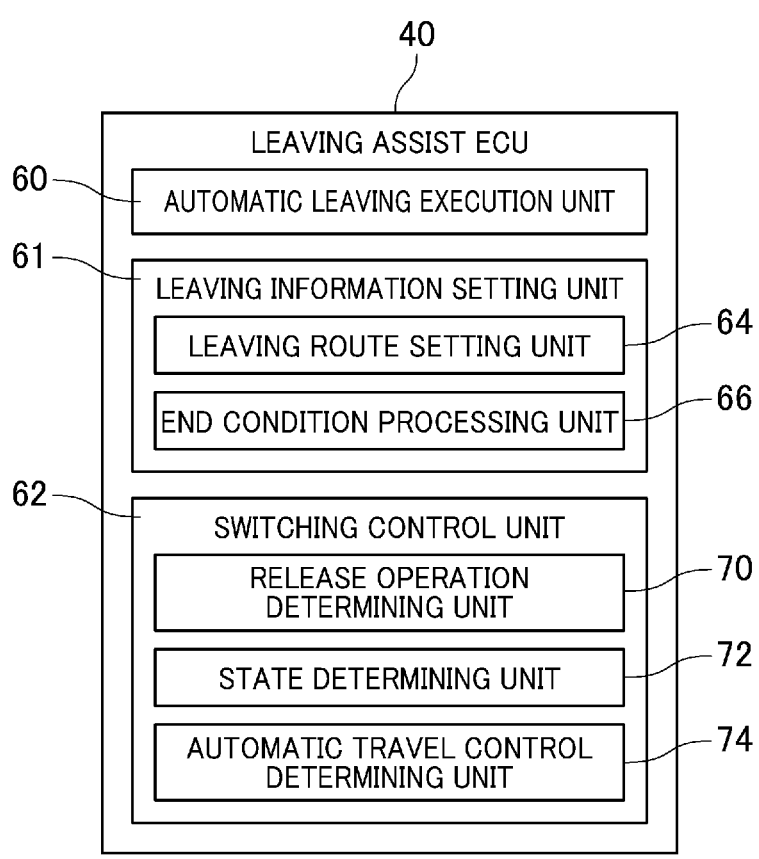
FIG. 2 is a block diagram showing a functional configuration of a leaving assist ECU.

FIG. 2 is a block diagram showing a functional configuration of the leaving assist ECU 40.

As shown in FIG. 2, the leaving assist ECU 40 includes an automatic leaving execution unit 60, a leaving information setting unit 61, and a switching control unit 62. Those functional units are achieved by executing the program stored in the memory device by the processor of the leaving assist ECU 40. Note that such program may be recorded in a recording medium such as a semiconductor memory or a CD or may be distributed via a telecommunication line such as the Internet.

The automatic leaving execution unit 60 executes automatic leaving by controlling the automatic travel control unit 42, when an instruction from the driver is received via the user interface unit 12.

The leaving information setting unit 61 sets the information used for controlling automatic leaving and outputs the information to the automatic leaving execution unit 60, and includes a leaving route setting unit 64 that sets the leaving route and an end condition processing unit 66 that performs setting and determining the end condition of the automatic travel control.

The leaving route is a route from the parking position (current position) of the vehicle 2 to the target position after completion of leaving. In the memory device of the leaving assist ECU 40 or the storage apparatus provided to the vehicle 2, stored is information (typically map information) showing at least respective shapes and positional information of the parking space Ps and the periphery of the parking space Ps. Further, the leaving route setting unit 64 calculates the route to the target position via which the vehicle 2 makes no contact with obstacles based on the information and the peripheral obstacles detected by the periphery detection apparatus 54. Note that when the detection unit 44 includes a camera that captures images from the parking position of the vehicle 2 to the target position, the leaving route setting unit 64 may identify the shape of the parking space Ps by recognizing a frame line of the parking space Ps from the captured image of the camera, for example, to calculate the leaving route to the target position set in the area outside the parking space Ps.

The end condition processing unit 66 sets the arrival of the vehicle 2 at the target position, for example, as the end condition, and determines whether or not the end condition is satisfied during the automatic travel control.

Note that an appropriate method used in the advanced driver assistance system (ADAS) and automatic drive (AD) can be applied to the method for calculating the leaving route, the method for setting the end condition, and the method for determining the end condition.

Upon acquiring the leaving route and the end condition, the automatic leaving execution unit 60 gives an instruction to the automatic travel control unit 42 to keep traveling the vehicle 2 along the leaving route until the end condition is satisfied. Thereby, the automatic travel control mode are started and the vehicle 2 starts automatic traveling.

The switching control unit 62 controls takeover while the automatic travel control are being executed. "Takeover" is to switch the driving of the vehicle 2 from the automatic travel control mode to driving of the driver, and the switching control unit 62 performs the switching control. When a predetermined release operation is performed, the switching control unit 62 of the embodiment determines the state of the vehicle 2 of that point and executes the travel control appropriate for the state as necessary before executing takeover. Specifically, the switching control unit 62 includes a release operation determining unit 70, a state determining unit 72, and an automatic travel control determining unit 74.

The release operation determining unit 70 determines whether or not a predetermined release operation is executed by a user such as the driver during execution of the automatic travel control. The release operation is a user operation for giving an instruction to stop the automatic travel control, and driving operations (braking operation and steering operation) of the vehicle 2 are allotted thereto. Other than the driving operations, appropriate operations such as operations for the user interface unit 12 can also be allotted to the release operation.

The state determining unit 72 determines the state of the vehicle 2 when the release operation is performed based on the detection result of the detection unit 44. The state of the vehicle 2 is a leaving state of the vehicle 2 from the parking space Ps at the timing where the release operation is performed. The leaving state is quantified based on the proportion of the vehicle body 2A that is out of the parking space Ps or inside the parking space Ps (hereinafter, referred to as "leaving degree").

Figure 3:
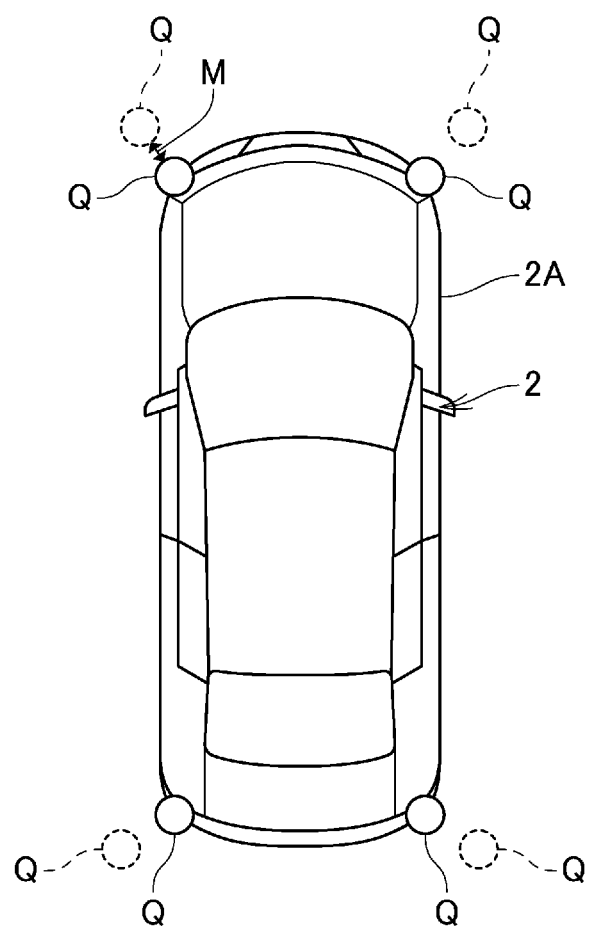
FIG. 3 is a schematic view showing setting of feature points.

In the embodiment, the state determining unit 72 easily acquires the leaving degree in a following manner. That is, as shown in FIG. 3, feature points Q are set in advance at each of four areas in the back and front as well as the left and right on an external shape of the vehicle body 2A on a plan view (more precisely, four corners of the substantially rectangular vehicle body 2A). Note that each of the feature points Q may be set at the position with a predetermined margin M being added to the external shape of the vehicle body 2A as shown in FIG. 3 with broken lines.

Then, the state determining unit 72 identifies the number of feature points Q located outside the parking space Ps (hereinafter, referred to as "number of feature points outside the parking space") based on the detection result of the detection unit 44, and takes the number of feature points outside the parking space as the leaving degree.

For example, when the number of feature points outside the parking space is "0", the entire vehicle body 2A is being located inside the parking space Ps so that the leaving degree is "0". As the number of feature points outside the parking space increases, the area of the vehicle body 2A located outside the parking space Ps increases so that the leaving degree is increased. Then, when the number of feature points outside the parking space is "4", the entire vehicle body 2A is in a state of being located outside the parking space Ps so that the leaving degree comes to be "1".

As long as the feature point Q is set at least at each of the front end and back end of the traveling direction of the vehicle 2, an appropriate number of feature points Q may be set at other places as necessary.

Further, the number of feature points outside the parking space can be identified based on the relative positional information between the vehicle body 2A and the parking space Ps and the set positions of the feature points Q in the vehicle body 2A, for example. The relative positional relation between the vehicle body 2A and the parking space Ps can be identified based on the shape of the vehicle body 2A, the shape of the parking space Ps, the position of the vehicle 2, and the posture (angle) of the vehicle body 2A with respect to the parking space Ps, for example. In this case, the shape of the vehicle body 2A and the set positions of the feature points Q are predefined values, and stored in advance in a memory device such as a ROM. Further, the shape of the parking space Ps, the position of the vehicle 2, and the posture (angle) of the vehicle 2 with respect to the parking space Ps are detected by the position detection apparatus 52 and/or the periphery detection apparatus 54 of the detection unit 44. For example, when the periphery detection apparatus 54 has a function of generating a bird's-eye image of the vehicle 2 from an image captured by a camera from the above, the relative positional information between the vehicle body 2A and the parking space Ps and further the number of feature points outside the parking space can be detected based on the frame line of the parking space Ps and the vehicle body 2A captured in the bird's-eye image.

When a release operation is performed, the automatic travel control determining unit 74 determines whether or not to perform a predetermined automatic travel control (in the embodiment, an automatic speed reduction and stop control for automatically braking the vehicle 2) before executing takeover based on the determination result acquired by the state determining unit 72.

Specifically, when the leaving degree is low, that is, when the number of feature points outside the parking space is equal to or less than a first threshold value, the automatic travel control determining unit 74 determines to automatically execute the automatic speed reduction and stop control of the vehicle 2 before executing takeover. Inversely, when the leaving degree is high, that is, when the number of feature points outside the parking space is equal to or more than a second threshold value, the automatic travel control determining unit 74 determines to immediately execute takeover without executing the automatic speed reduction and stop control. Note that the first threshold value and the second threshold value may be a same value.

When determined to execute takeover by the switching control unit 62, the automatic leaving execution unit 60 gives an instruction to the automatic travel control unit 42 such that takeover is executed according to the determination result of the automatic travel control determining unit 74. Thereby, according to the state of the vehicle 2 when the release operation is performed, takeover is executed after performing the speed reduction and stop control of the vehicle 2 as necessary or executed immediately without executing the speed reduction and stop control.

Next, actions of the leaving assist system 1 will be described.

Figure 4:
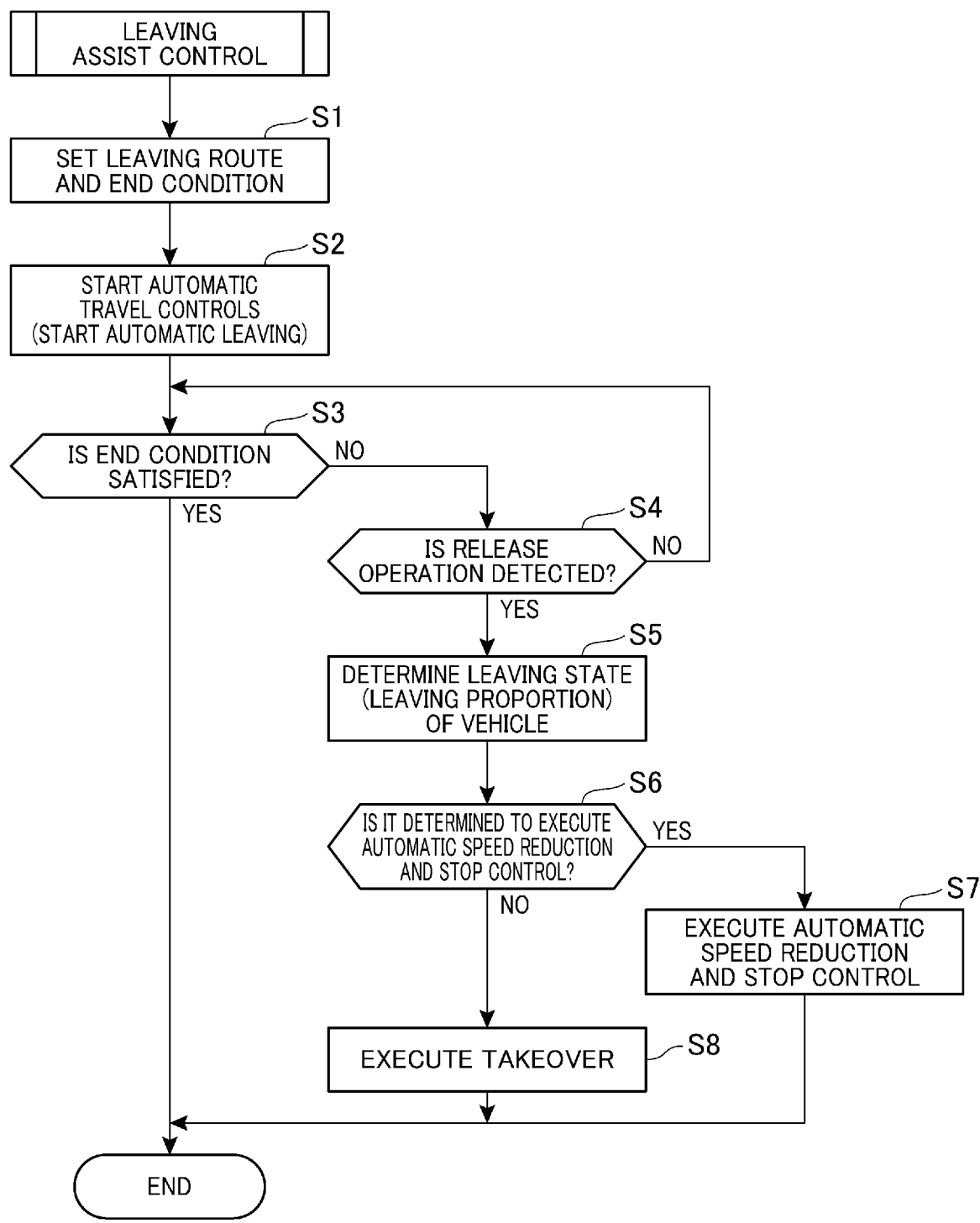
FIG. 4 is a flowchart of a leaving assist control executed by the leaving assist ECU of the leaving assist system.
Figure 5:
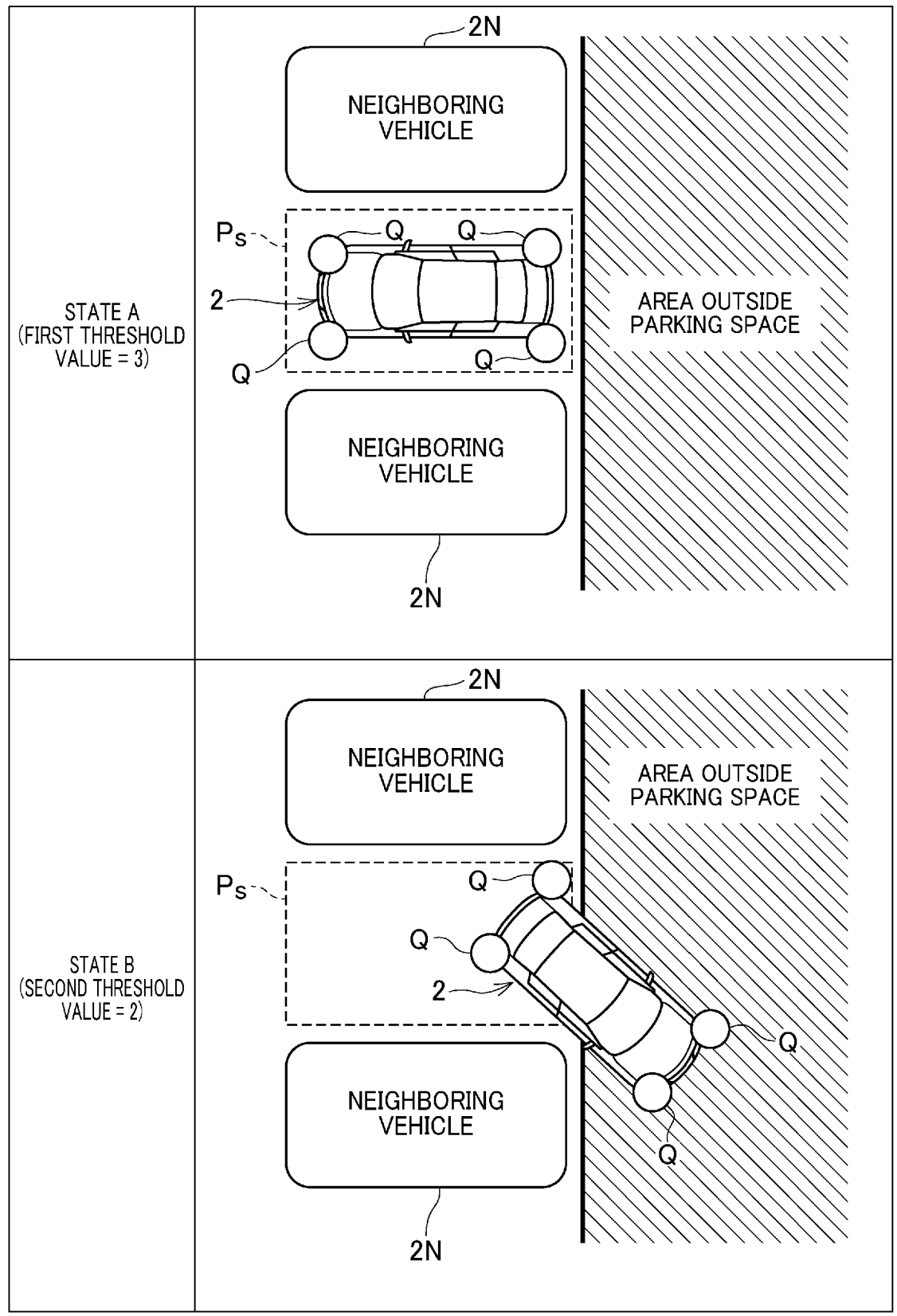
FIG. 5 is a schematic view showing an example of a state when parking a vehicle in a parking space.

FIG. 4 is a flowchart of a leaving assist control executed by the leaving assist ECU 40 of the leaving assist system 1. Further, FIG. 5 is a schematic view showing an example of a state when parking the vehicle 2 in the parking space Ps.

When the driver gives an instruction to execute automatic leaving by an operation of the user interface unit 12, the automatic leaving execution unit 60 receives the instruction, and the leaving information setting unit 61 sets leaving route and the end condition of the automatic travel control (automatic leaving) (step S1). Then, the automatic leaving execution unit 60 gives an instruction to the automatic travel control unit 42 to start the automatic travel control (step S2). Then, it is determined by the end condition processing unit 66 that the end condition is satisfied (step S3), the automatic travel control unit 42 ends the automatic travel control, and the automatic leaving of the vehicle 2 is completed thereby.

In the meantime, when the release operation is performed by the user while the automatic travel control is being executed, the release operation determining unit 70 makes determination regarding input of the release operation (Yes in step S4), and the state determining unit 72 makes determination regarding the state of the vehicle 2 of that point, that is, the leaving degree that shows the leaving state of the vehicle 2 (step S5).

Then, the automatic travel control determining unit 74 determines whether or not to execute the automatic speed reduction and stop control before executing takeover based on the determination result of the state determining unit 72 (step S6).

Specifically, as in a state A of FIG. 5, when the number of feature points outside the parking space is equal to or less than the predetermined first threshold value, that is, when the leaving degree is low and most part of the vehicle body 2A remains in the parking space Ps, the automatic travel control determining unit 74 determines to execute the automatic speed reduction and stop control (Yes in step S6). Then, the automatic leaving execution unit 60 gives an instruction to the automatic travel control unit 42 to execute the automatic speed reduction and stop control (step S7), and ends the automatic leaving control without executing takeover.

In the meantime, as in a state B of FIG. 5, when the number of feature points outside the parking space is equal to or more than the second threshold value, that is, when the leaving degree is high and most part of the vehicle body 2A is out of the parking space Ps, the automatic travel control determining unit 74 determines to immediately execute takeover without executing the automatic speed reduction and stop control (No in step S6). Thereby, the automatic leaving execution unit 60 gives an instruction to the automatic travel control unit 42 such that takeover is executed according to the determination result of the automatic travel control determining unit 74 (step S8). Thereby, the automatic leaving execution unit 60 gives an instruction to the automatic travel control unit 42 to execute takeover (step S8), so that takeover is immediately executed and the automatic leaving control is ended.

With such leaving assist control, the driver can execute takeover by performing the release operation while automatic leaving is being executed by the automatic travel control so as to drive the vehicle 2 by driving operations of the driver oneself. This makes it possible to release the automatic travel control when the driver perceives danger.

In this case, as in the state A of FIG. 5, when the driver perceives danger under a state where the leaving degree is equal to or less than the first threshold value and most part of the vehicle 2 remains in the parking space Ps, it is highly probable that the subject of the danger is contact with obstacles (neighboring vehicles 2N in the case of FIG. 5) existing nearby. In other words, it can be considered that the fact that the leaving degree of the vehicle 2 is equal to or less than the first threshold value is a state where there is relatively high possibility that the vehicle 2 comes to contact with the nearby obstacle such as the neighboring vehicle 2N.

In the embodiment, when the leaving degree is low at the time of release operation, the automatic speed reduction and stop control is executed as the automatic travel control prior to takeover, so that contact with the obstacle can be avoided. Further, even if the driver performs a driving operation (for example, steering operation) that is different from the braking operation as the release operation, the automatic speed reduction and stop control is to be executed regardless of the content of the driving operation and contact with the obstacle can be avoided.

In the meantime, as in the state B of FIG. 5, when the driver perceives danger under a state where the leaving degree is high and most part of the vehicle 2 is out of the parking space Ps, it is highly possible that the danger is contact with another car traveling outside the parking space Ps. In other words, it can be considered that the fact that the leaving degree of the vehicle 2 is equal to or more than the second threshold value is a state where there is relatively high possibility that there is another vehicle approaching the own vehicle 2.

In the embodiment, takeover is immediately performed without executing the automatic speed reduction and stop control when the leaving degree is high at the time of the release operation, so that it is possible to suppress shortening of the distance between the vehicle 2 and another approaching vehicle. Further, because the driver becomes capable of performing the driving operation of the vehicle 2 immediately, it is possible to avoid danger by keep traveling or by performing a driving operation such as evacuating to a safe space, for example, in accordance with the traveling of the other vehicle.

Note here that the state determining unit 72 in the leaving assist system 1 determines whether the leaving degree of the vehicle 2 is low or high based on the feature points outside the parking space, the first threshold value, and the second threshold value as described above. For the first threshold value and the second threshold value, used are values corresponding to the positional relations between the parked vehicle 2 and the neighboring vehicles 2N neighboring to the vehicle 2 in the back and front as well as left and right.

Figure 6:
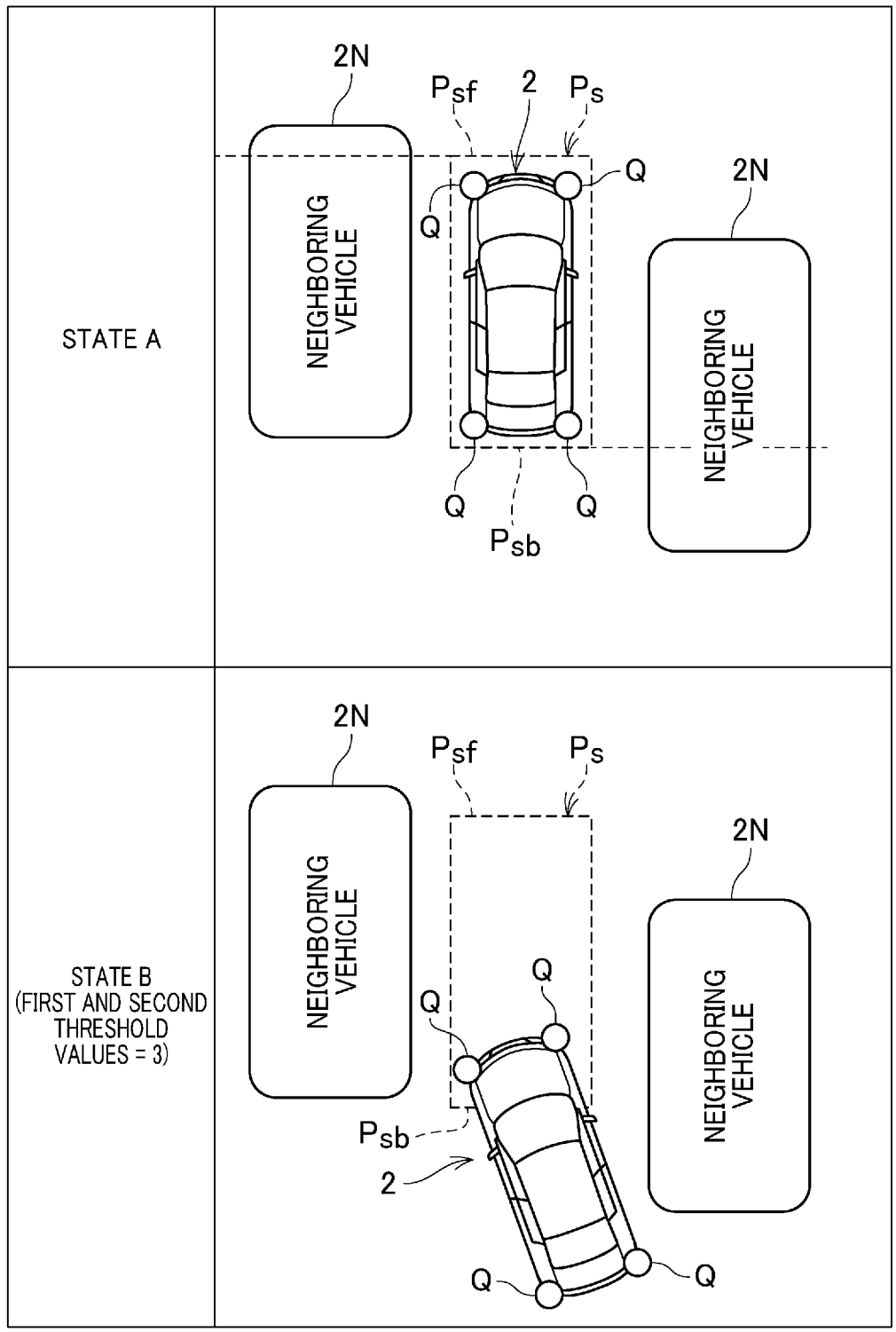
FIG. 6 is a schematic view showing another example of a state when parking a vehicle in a parking space.

For example, as in a state A of FIG. 6, there may be a case where the neighboring vehicles 2N are perpendicular parking on the left and right of the vehicle 2 while being shifted in the front and rear directions of the vehicle 2. In such case, the neighboring vehicles 2N on left and right are parked at positions projected from a front end Psf or a back end Psb of the parking space Ps of the vehicle 2. Therefore, as in a state B of FIG. 6, even when most part of the vehicle 2 is out of the front end Psf or the back end Psb of the parking space Ps, there still remains danger of approaching the parked neighboring vehicles 2N in a specific distance or less and making contact therewith. Therefore, in the state B of FIG. 6, the state determining unit 72 increases the first threshold value (for example, first threshold value="3") of the feature points outside the parking space with which the leaving degree is determined as low so that the automatic speed reduction and stop control is immediately executed prior to execution of takeover at the time of the release operation when it is still possible for the distance with respect to the neighboring vehicles 2N to become equal to or shorter than the specific distance.

Figure 7:
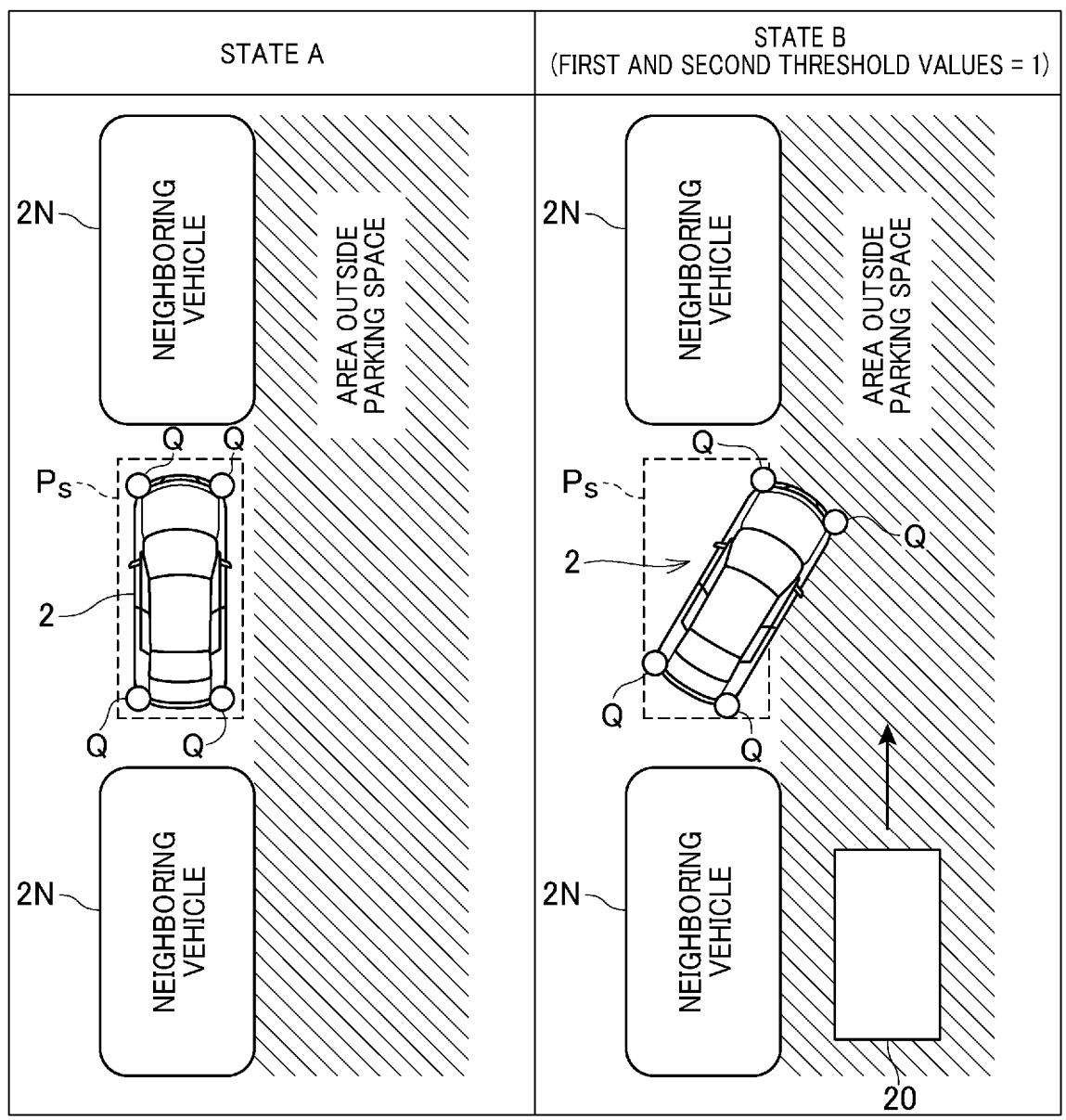
FIG. 7 is a schematic view showing an example of a state when parallel parking a vehicle.

Further, for example, as in a state A of FIG. 7, there may be a case where there are the neighboring vehicles 2N parallel parking in front and back of the vehicle 2. In such case, as in a state B of FIG. 7, in a state where the front end or the back end of the vehicle 2 comes to be out of the parking space Ps, danger of contacting with the neighboring vehicles 2N is lowered while the risk of contact with another approaching vehicle 2O traveling outside the parking space Ps is relatively increased. Therefore, in the state shown in FIG. 7, the state determining unit 72 lowers the threshold value (for example, threshold value="1") of the feature points outside the parking space with which the leaving degree is determined as low such that takeover is immediately executed at the time of the release operation performed afterwards when the front end or the back end of the vehicle 2 comes to be out of the parking space Ps.

With the embodiment, following effects can be achieved.

When a release operation for giving an instruction to stop the automatic travel control is inputted while automatic leaving is being performed by the automatic travel control mode in the leaving assist system 1 of the embodiment, it is determined whether or not to perform the automatic speed reduction and stop control before switching driving of the vehicle 2 to driver's driving operation mode (takeover) according to the state of the vehicle 2 when the release operation is inputted.

This makes it possible to switch driving of the vehicle 2 to the driver's driving operation mode in a traveling state that is appropriate for the state of the vehicle 2 at the time of the release operation, so that the driving can be appropriately assisted.

In the leaving assist system 1 of the embodiment, it is determined to perform the automatic speed reduction and stop control before switching driving of the vehicle 2 to the driver's driving operation mode when the leaving degree of the vehicle 2 from the parking space Ps when the release operation is inputted is equal to or less than the first threshold value.

Thereby, when the driver perceives contact between the vehicle 2 and the obstacle existing near the parking space Ps of the vehicle 2 and performs a release operation, the vehicle 2 is immediately braking-controlled so that contact with the obstacle can be avoided.

In the leaving assist system 1 of the embodiment, it is determined not to execute the automatic speed reduction and stop control before switching driving of the vehicle 2 to the driver's driving operation mode when the leaving degree of the vehicle 2 from the parking space Ps at the time when the release operation is inputted is equal to or more than the second threshold value.

Thereby, when the driver perceives approach of another vehicle to the own vehicle 2 and performs a release operation, takeover is executed without performing the automatic speed reduction and stop control so that shortening in the distance between another approaching vehicle and the vehicle 2 can be suppressed. Further, because the driver becomes capable of performing the driving operation of the vehicle 2 immediately, it is possible to avoid danger by keep traveling or by performing a driving operation such as evacuating to a safe space, for example, in accordance with the traveling of the other vehicle.

A plurality of feature points Q are set in advance on the external shape of the vehicle 2 in the leaving assist system 1 of the embodiment, and the state determining unit 72 determines the leaving state according to the number of feature points Q out of the parking space Ps.

Thereby, the leaving degree of the vehicle 2 can be easily identified.

Note that the embodiment described above is simply an example of a mode of the present invention, and any modification and application are possible without departing from the range of the gist of the present invention.

Figure 8:
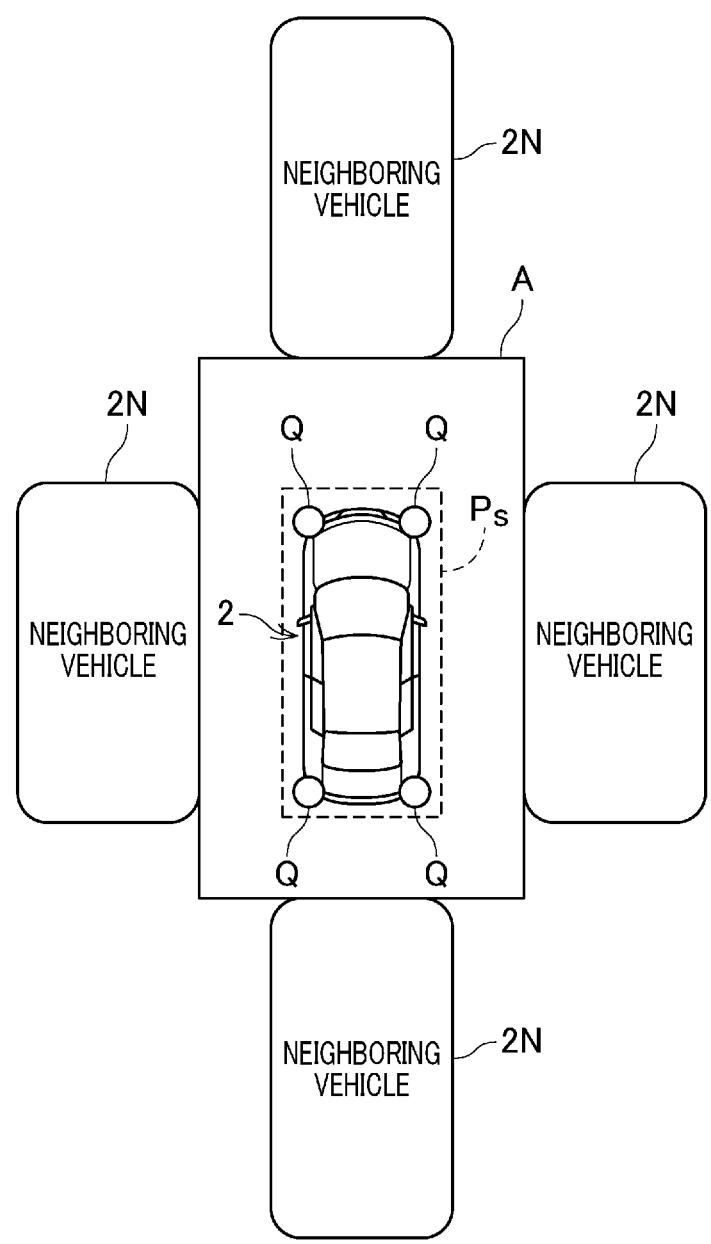
FIG. 8 is an explanatory view for setting a parking space based on surrounding structures of a vehicle.

While the configuration with which the shape of the parking space Ps is identified from the map information, the parking frame line, and the like is presented in the embodiment described above, the configuration for identifying the shape of the parking space Ps is not limited thereto. For example, as shown in FIG. 8, it is possible to detect structures (neighboring vehicles 2N in the case of FIG. 8) such as neighboring vehicles 2N or wall surfaces existing in front and back as well as left and right of the own vehicle 2, and define an area A sectioned by those structures as the parking space Ps. In such case, as a boundary of the parking space Ps in a part having no structures nearby out of the front and back as well as left and right of the own vehicle 2, it is possible to set the external shape line of the own vehicle 2 as the boundary or to set the boundary based on the positional relation of other structures, for example. In such case, the distance with respect to the structures can be identified by using the obstacle sensor.

In the embodiment described above, the first threshold value and the second threshold value indicating whether the leaving degree of the vehicle 2 is low or high may be adjusted according to the distance with respect to the neighboring vehicles 2N located in the traveling direction of the vehicle 2. That is, the longer the distance, the lower the risk of contact with the neighboring vehicles 2N. Therefore, it is possible to lower the first threshold value with which the leaving degree is determined as low.

Figure 9:
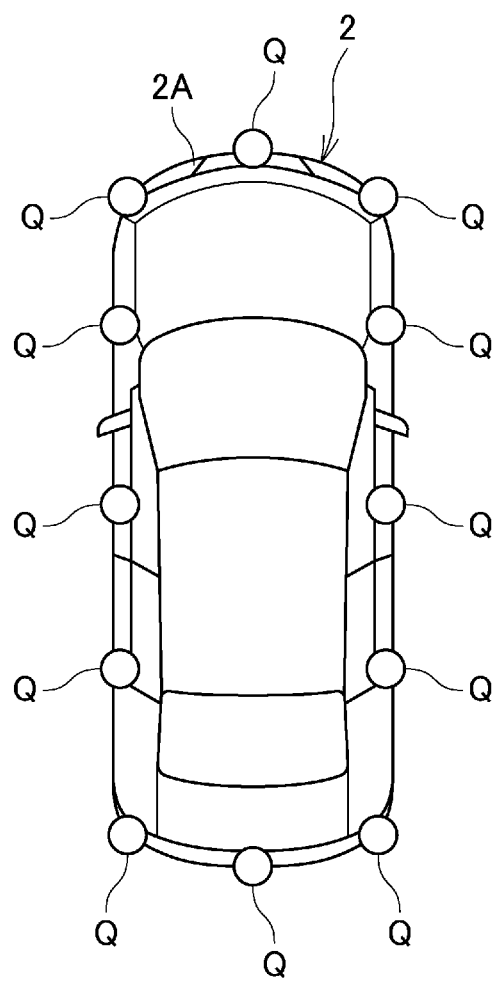
FIG. 9 is a schematic view showing a modification example regarding setting of the feature points.

Not limited to the case of the embodiment described above in which the feature points Q are set at four places in the four corners of the vehicle 2, as shown in FIG. 9 it is also possible to set the feature points Q as necessary at places where there is relatively high possibility of contacting with obstacles and the like under automatic leaving, such as places of wheels, intermediate positions between the front and back of the vehicle body 2A, and intermediate positions between the left and right sides in addition to the four corners of the vehicle 2.

Further, the setting places and the setting number of feature points Q may be changed according to the positional relation between the parked own vehicle 2 and the neighboring vehicles 2N every time the automatic leaving is executed such that the state where there is relatively high possibility of contacting with nearby obstacles can be identified from the number of feature points Q remaining in the parking space Ps.

Figure 10:
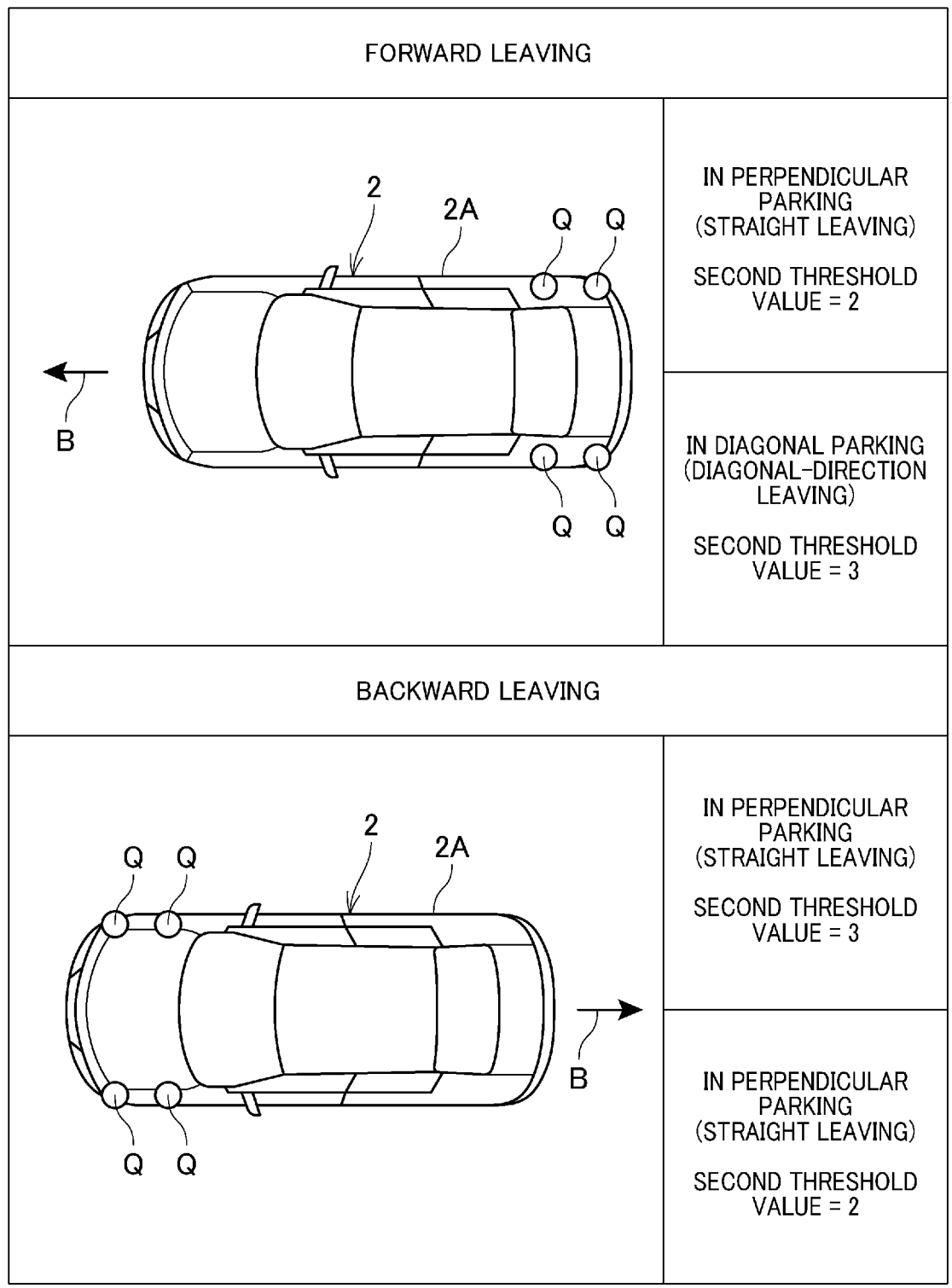
FIG. 10 is a schematic view showing a modification example regarding setting of the feature points at the time of perpendicular parking and diagonal parking.

For example, as shown in FIG. 10, when there are neighboring vehicles 2N existing on left and right of the own vehicle 2 as in the cases of perpendicular parking and diagonal parking, the feature points Q are disposed in an unbalanced manner on the back end side of the vehicle body 2A from the traveling direction B at the time of automatic leaving.

Figure 11:
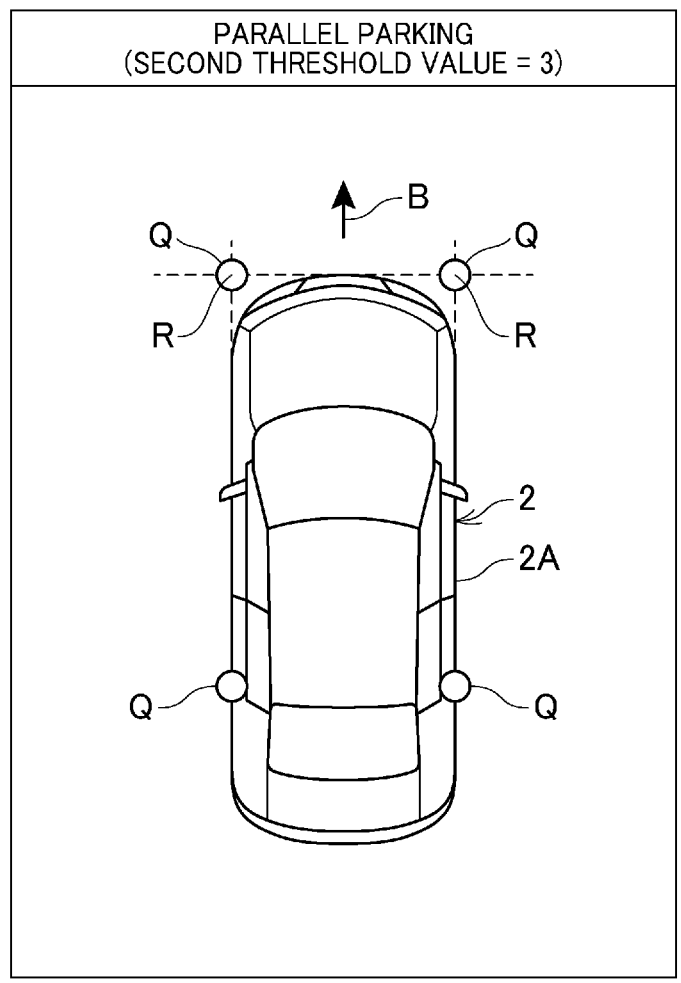
FIG. 11 is a schematic view showing a modification example regarding setting of the feature points at the time of parallel parking.

Further, for example, as shown in FIG. 11, when there are neighboring vehicles 2N existing in front and back of the own vehicle 2 as in the case of parallel parking, the feature point Q is disposed, respectively, at intersection points R between the front end of the vehicle 2 and the external shape lines on left and right and at the positions of the rear wheels.

Thereby, the leaving state of the vehicle 2 from the parking space Ps at the time of automatic leaving, that is, the possibility of contacting with the nearby obstacles can be accurately determined.

Further, as shown in FIG. 10 and FIG. 11, the threshold value (second threshold value in the case of FIGS. 10 and 11) for determining the leaving degree of the vehicle 2 from the parking space Ps is appropriately changed depending on the parking modes such as perpendicular parking, diagonal parking, and parallel parking as well as the traveling direction B at the time of automatic leaving.

In the embodiment described above, presented is the case of executing takeover by taking the release operation as a trigger. The present invention is not limited to such case but may also be applied to a configuration where takeover is executed not upon the release operation but when a predetermined condition is satisfied.

That is, by determining the state of the vehicle 2 before executing takeover and determining whether or not to execute a predetermined automatic travel control based on the state of the vehicle 2, it is possible to execute takeover in an appropriate traveling state according to the state of the vehicle 2 and to assist driving of the driver more appropriately.

While ECUs are used for various kinds of control apparatuses in the embodiment described above, it is also possible to use appropriate computers and electronic circuits such as ASIC and SoC (System on Chip).

In the embodiment described above, the functional blocks shown in FIG. 1 and FIG. 2 are schematic views in which structural elements are classified according to the main processing content to enable easy understanding of the present invention, and the structural elements may be classified into a greater number of structural elements according to the processing contents. Further, it is also possible to classify a single structural element to execute still greater kinds of processing.

Further, as for various kinds of numerical values and shapes in the embodiment described above, peripheral ranges of those numerical values and similar shapes are not to be intentionally excluded unless it is specifically mentioned so, and the peripheral ranges and similar shapes (the so-called range of equivalency) are to be included as long as the same effects can be achieved therewith and the numerical values are not departed from the significance of critical range.

REFERENCE SIGNS LIST

1 Leaving assist system
2 Vehicle, Own vehicle
2A Vehicle body
2N Neighboring vehicle
20 Another vehicle
40 Leaving assist ECU (assist apparatus)
42 Automatic travel control unit
44 Detection unit
60 Automatic leaving execution unit
61 Leaving information setting unit
62 Switching control unit
64 Leaving route setting unit
66 End condition processing unit
70 Release operation determining unit 72 State determining unit
74 Automatic travel control determining unit
Ps Parking space
Q Feature point

What is claimed is:

1. An assist apparatus for a vehicle leaving a parking space, comprising: a processor that includes:
    an automatic leaving execution unit configured to execute automatic leaving by automatic travel control mode of the vehicle;
    a switching control unit configured to switch driving of the vehicle from the automatic travel control mode to driver's driving operation mode;
    a state determining unit configured to determine a state of the vehicle;
    an automatic travel control determining unit configured to determine, according to a determination result of the state of the vehicle, whether or not to perform a predetermined automatic travel control before switching the driving of the vehicle from the automatic travel control mode to the driver's driving operation mode; and
    a release operation determining unit configured to determine input of a release operation for giving an instruction to stop the automatic travel control mode, wherein
    the automatic travel control determining unit makes determination based on the state of the vehicle when the release operation is inputted,
    the state determining unit determines a leaving state of the vehicle from the parking space, and
    when a leaving degree of the vehicle from the parking space when the release operation is inputted is equal to or less than a first threshold value, the automatic travel control determining unit determines to perform the predetermined automatic travel control to brake the vehicle before switching the driving of the vehicle from the automatic travel control mode to the driver's driving operation mode.

2. The assist apparatus according to claim 1, wherein when the leaving degree of the vehicle from the parking space when the release operation is inputted is equal to or more than a second threshold value, the automatic travel control determining unit determines not to perform the predetermined automatic travel control before switching the driving of the vehicle from the automatic travel control mode to the driver's driving operation mode.

3. The assist apparatus according to claim 1, wherein:
    a plurality of feature points are set in advance on an external shape of the vehicle; and
    the state determining unit determines the leaving state based on the number of feature points out of the parking space.

4. A control method of an assist apparatus for a vehicle leaving a parking space, the assist apparatus comprising a processor that includes an automatic leaving execution unit configured to execute automatic leaving by automatic travel control mode of the vehicle, and a switching control unit configured to switch driving of the vehicle from the automatic travel control mode to driver's driving operation mode, the control method comprising:
    a first step of determining a state of the vehicle;
    a second step of determining, according to a determination result of the state of the vehicle, whether or not to perform a predetermined automatic travel control before switching the driving of the vehicle from the automatic travel control mode to the driver's driving operation mode; and
    a third step of determining input of a release operation for giving an instruction to stop the automatic travel control mode, wherein
    in the second step, determination is made based on a state of the vehicle when the release operation is inputted,
    in the first step, a leaving state of the vehicle from the parking space is determined, and
    in the second step, when a leaving degree of the vehicle from the parking space when the release operation is inputted is equal to or less than a first threshold value, it is determined to perform the predetermined automatic travel control to brake the vehicle before switching the driving of the vehicle from the automatic travel control mode to the driver's driving operation mode.

5. The control method of the assist apparatus according to claim 4, wherein
    in the second step, when the leaving degree of the vehicle from the parking space when the release operation is inputted is equal to or more than a second threshold value, it is determined not to perform the predetermined automatic travel control before switching the driving of the vehicle from the automatic travel control mode to the driver's driving operation mode.

6. The control method of the assist apparatus according to claim 4, wherein
    in the first step, the leaving state is determined based on the number of feature points that are out of the parking space among a plurality of the feature points set in advance on an external shape of the vehicle.

* * * * *